US 12,394,857 B2

(12) United States Patent
Wang

(10) Patent No.: US 12,394,857 B2
(45) Date of Patent: Aug. 19, 2025

(54) BATTERY PACK

(71) Applicant: CALB Co., Ltd., Jiangsu (CN)

(72) Inventor: Ping Wang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 509 days.

(21) Appl. No.: 17/901,807

(22) Filed: Sep. 1, 2022

(65) Prior Publication Data

US 2024/0006704 A1 Jan. 4, 2024

(30) Foreign Application Priority Data

Jun. 30, 2022 (CN) .......................... 202210770619.5

(51) Int. Cl.
*H01M 50/291* (2021.01)
*H01M 10/48* (2006.01)
*H01M 50/204* (2021.01)

(52) U.S. Cl.
CPC ....... *H01M 50/291* (2021.01); *H01M 10/482* (2013.01); *H01M 50/204* (2021.01)

(58) Field of Classification Search
CPC ... H01M 50/291; H01M 50/204; H01M 10/48
See application file for complete search history.

(56) References Cited

U.S. PATENT DOCUMENTS

| | | | | |
|---|---|---|---|---|
| 2004/0016455 | A1* | 1/2004 | Oogami | H01M 50/291 |
| | | | | 136/251 |
| 2014/0023893 | A1* | 1/2014 | Shimizu | H01M 50/227 |
| | | | | 429/156 |
| 2020/0411816 | A1* | 12/2020 | Yoneyama | H01M 10/613 |
| 2021/0175586 | A1* | 6/2021 | Haruki | H01M 50/298 |
| 2022/0085346 | A1* | 3/2022 | Zhang | H01M 50/20 |

FOREIGN PATENT DOCUMENTS

| | | |
|---|---|---|
| EP | 3726609 | 10/2020 |
| WO | 2021149299 | 7/2021 |

OTHER PUBLICATIONS

"Search Report of Europe Counterpart Application", issued on Aug. 21, 2023, p. 1-p. 8.

* cited by examiner

*Primary Examiner* — Alexander Usyatinsky
(74) *Attorney, Agent, or Firm* — JCIP GLOBAL INC.

(57) ABSTRACT

A battery pack includes a battery set and a battery monitoring unit, is provided. The battery set includes multiple battery units. The battery units are disposed side by side in a column direction. In the column direction, the battery unit located at one end of the battery set has an expansion portion. The expansion portion is formed in a center region of an end surface of the battery set in the column direction. The battery monitoring unit is disposed on the end surface of the battery set. In the column direction, the battery monitoring unit is staggered from the expansion portion.

8 Claims, 7 Drawing Sheets

BATTERY PACK

CROSS-REFERENCE TO RELATED APPLICATION

This application claims the priority benefit of China application serial no. 202210770619.5, filed on Jun. 30, 2022. The entirety of the above-mentioned patent application is hereby incorporated by reference herein and made a part of this specification.

BACKGROUND

Technical Field

The disclosure relates to the technical field of battery, and in particular to a battery pack.

Description of Related Art

The battery monitoring unit (abbreviated as CSC) is a control system in a battery pack and is used to monitor battery information such as voltage and temperature of each battery unit or battery set. However, the battery monitoring unit in the related art is easily affected by other components in the battery pack, which results in reduced operational reliability.

SUMMARY

The disclosure provides a battery pack.

The battery pack of an embodiment of the disclosure includes a battery set and a battery monitoring unit. The battery set includes a plurality of battery units, and the battery units are disposed side by side in a column direction. In the column direction, one of the battery units located at one end of the battery set has an expansion portion. The expansion portion is formed in a center region of an end surface of the battery set in the column direction. The battery monitoring unit is disposed on the end surface of the battery set, and in the column direction, the battery monitoring unit is staggered from the expansion portion.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
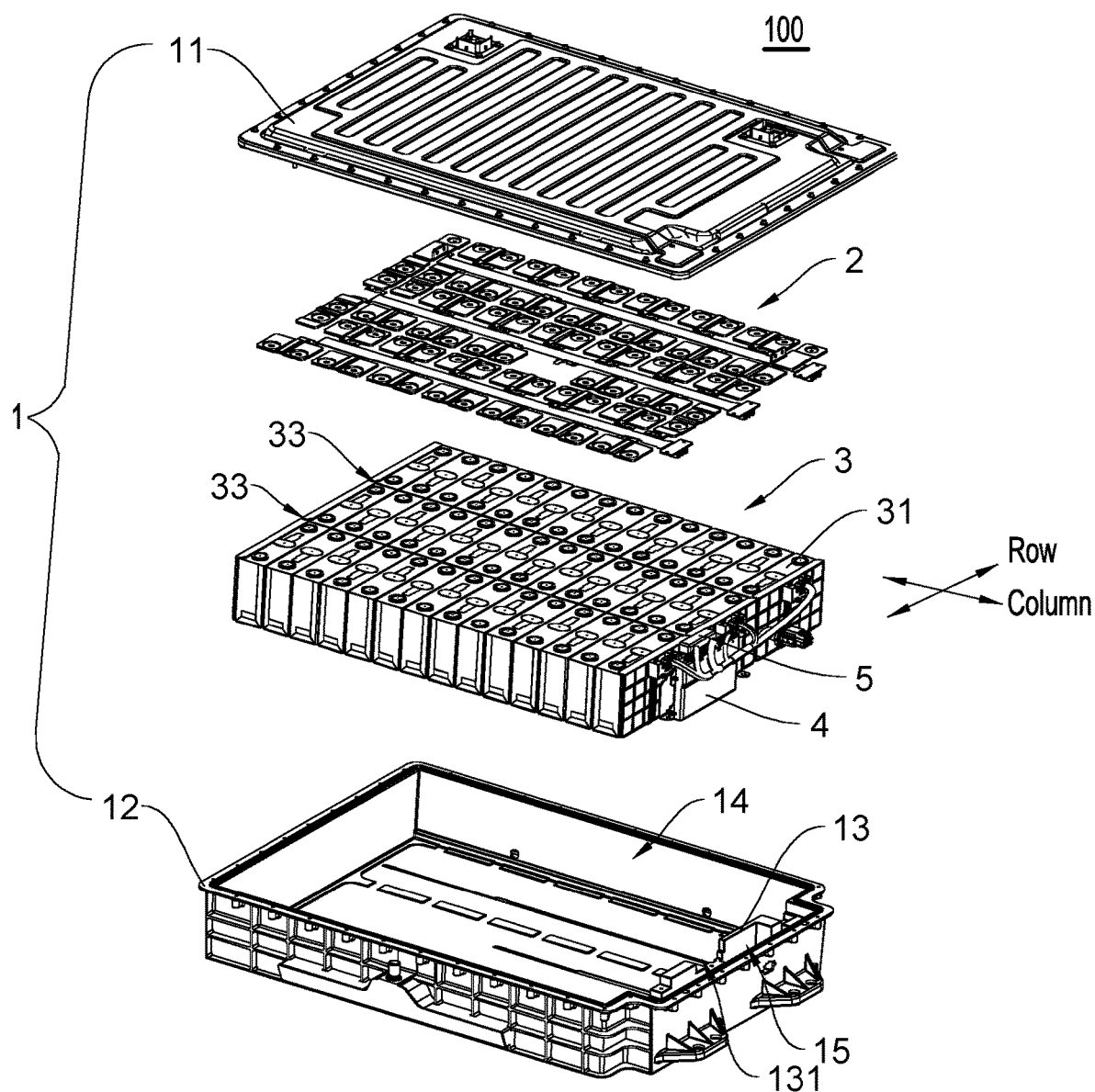
FIG. 1 shows a schematic exploded view of a battery pack according to an embodiment of the disclosure.

As shown in FIG. 1, FIG. 1 shows a schematic exploded view of a battery pack 100 according to an embodiment of the disclosure. The battery pack 100 of the embodiment of the disclosure includes a case body 1, a conductor bar assembly 2, battery sets 3, and a battery monitoring unit 4. The case body 1 has a sealed chamber. The conductor bar assembly 2, the battery sets 3, and the battery monitoring unit 4 are disposed in the sealed chamber. The conductor bar assembly 2 may be disposed above the battery sets 3 and may be used to connect poles of the battery sets 3. The battery monitoring unit 4 is connected to the conductor bar assembly 2 and may be used to monitor a battery signal of the battery sets 3.

It can be understood that the battery signal may include temperature, current, voltage, etc. of a battery.

The terms "including" and "having" and any variations thereof in the embodiments of the disclosure are intended to cover non-exclusive inclusion. For example, a process, a method, a system, a product, or an equipment including a series of steps or units is not limited to the listed steps or units, but optionally also includes unlisted steps or units or optionally also includes other steps or components inherent to the process, the method, the product, or the equipment.

A coolant is also accommodated in the sealed chamber. The coolant immerses the conductor bar assembly 2, the battery sets 3, and the battery monitoring unit 4. Through the circulating flow of the coolant, heat generated by the conductor bar assembly 2, the battery sets 3, and the battery monitoring unit 4 is exported to dissipate the heat from the conductor bar assembly 2, the battery sets 3, and the battery monitoring unit 4.

The case body 1 includes an upper case 11 and a lower case 12. The upper case 11 and the lower case 12 are sealed to form the sealed chamber for accommodating the conductive bar assembly 2, the battery sets 3, and the battery monitoring unit 4.

Each of the battery sets 3 includes a plurality of battery units 31. The battery units 31 are disposed side by side in a column direction. As an example, each battery unit 31 has a cuboid shape, and a width direction of each battery unit 31 is parallel to the column direction. In other words, when the battery unit 31 has the cuboid shape, two adjacent battery units 31 are disposed side by side such that surfaces with the largest area are attached to each other.

Of course, the side-by-side arrangement of the battery units 31 may also be that the adjacent battery units 31 are disposed side by side such that surfaces formed by widths and heights are attached to each other.

In addition, in the disclosure, the number of battery sets 3 is not particularly limited. For example, the number of battery sets 3 may be one set, two sets, three sets, or other numbers. When the number of battery sets 3 is multiple, the plurality of battery sets 3 are disposed side by side in a row direction, wherein the row direction is perpendicular to the column direction. In this way, the battery units 31 form a battery array.

In the embodiment, the battery pack 100 includes three battery sets 3. The three battery sets 3 are disposed side by side in the row direction. Each battery set 3 includes multiple battery units 31. The battery units 31 are disposed side by side in the column direction.

Figure 2:
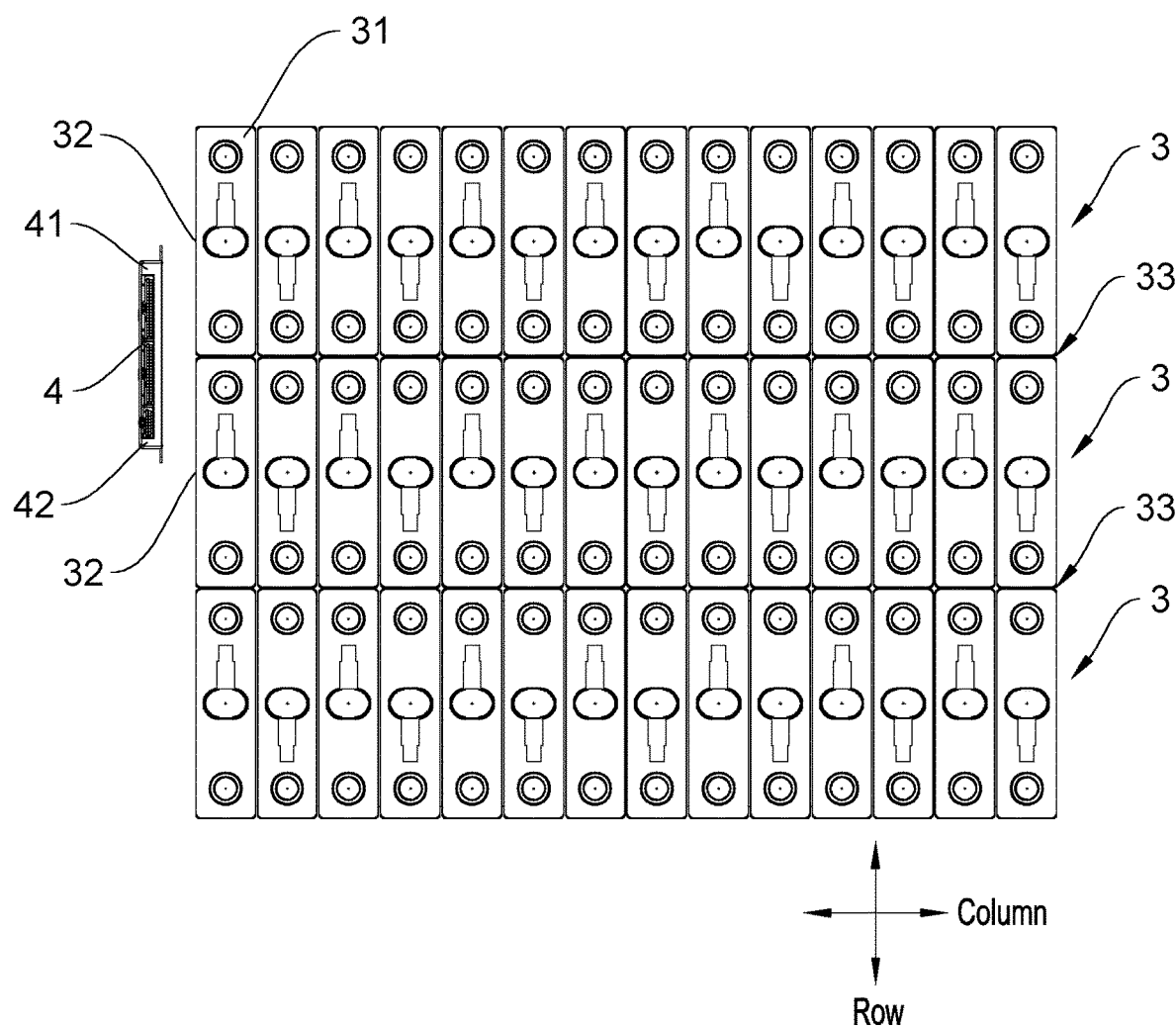
FIG. 2 shows a top view of a battery monitoring unit and battery sets according to a first embodiment of the disclosure.

As shown in FIG. 2, FIG. 2 shows a top view of a battery monitoring unit 4 and battery sets 3 according to a first embodiment of the disclosure. The battery unit 31 located at one end of the battery set 3 has an expansion portion 32. The expansion portion 32 is formed in a center region of an end surface of the battery set 3 in the column direction.

Specifically, when the battery unit 31 is operating, the battery unit 31 expands, which causes the shell of the battery unit 31 to protrude outward deform. The deformation of the battery unit 31 squeezes devices around the battery set 3, such as the battery monitoring unit 4. Since the center region of one side surface of the battery unit 31 is farther from an edge of the battery unit 31, the expansion deformation of the center region is larger. For ease of understanding, the battery unit 31 is exemplified as having the cuboid shape. The center region of one side surface formed by the length and the height of the cuboid-shaped battery unit 31 (that is, the "larger surface" of the cuboid) is the expansion portion 32. In other words, the center region of the side surface of the battery unit 31 is the intersecting region of two diagonals.

Please continue to refer to FIG. 2. It can be understood that the battery units 31 of each battery set 3 all have the expansion portions 32. Since the battery units 31 are disposed side by side, the deformations of the respective expansion portions 32 of the battery units 31 are added up, and the final added-up deformation is reflected in the expansion portions 32 of the battery units 31 located at one end of the battery sets 3 in the column direction.

The battery monitoring unit 4 of the embodiment of the disclosure is disposed on the end surface of the battery set 3, and in the column direction, the battery monitoring unit 4 is staggered from the expansion portions 32.

In the battery pack 100 of the embodiment of the disclosure, the battery monitoring unit 4 is disposed on the end surface of the battery set 3, and in the column direction, the battery monitoring unit 4 is staggered from the expansion portions 32. In this way, when the expansion portion 32 of each battery unit 31 is deformed, since the battery monitoring unit 4 is staggered from the expansion portion 32, the expansion portion 32 of each battery unit 31 will not squeeze the battery monitoring unit 4 to avoid affecting the normal operation of the battery monitoring unit 4 and improve the reliability of monitoring the battery signal.

Please continue to refer to FIG. 2. The battery sets 3 are disposed side by side in the row direction, and in the row direction, a junction 33 is formed between each two adjacent battery sets 3. In the column direction, the battery monitoring unit 4 is centrally disposed at the junction 33 of the two adjacent battery sets 3. In other words, the battery monitoring unit 4 is disposed across the two adjacent battery sets 3 in the row direction, and the battery monitoring unit 4 is equally divided by the junction 33.

It can be understood that in the row direction, the junction 33 formed between the two adjacent battery sets 3 may be a gap or may be seamless. When the junction 33 is the gap, the two adjacent battery sets 3 are disposed at an interval, and the gap may be used to accommodate a cushion pad. When the junction 33 is seamless, the two adjacent battery sets 3 are directly attached to each other.

In the row direction, with the junction 33 as a center line, the battery monitoring unit 4 is divided into a first part 41 and a second part 42. The shapes/sizes of the first part 41 and the second part 42 are basically the same. In the column direction, the first part 41 corresponds to one of the adjacent battery sets 3, and the first part 41 is staggered from the expansion portion 32 of the one of the battery sets 3. In the column direction, the second part 42 corresponds to the other one of the adjacent battery sets 3, and the second part 42 is staggered from the expansion portion 32 of the other one of the battery sets 3. In this way, when the size of the battery monitoring unit 4 is larger, since the battery monitoring unit 4 is centrally disposed at the junction 33 between the adjacent two battery sets 3, the battery monitoring unit 4 is as far away from the expansion portion 32 of each battery set 3 as possible, and corresponds to a position where the expansion deformation of the battery set 3 is smaller, so as to avoid squeezing the battery monitoring unit 4 due to the deformation of the expansion portion 32.

Figure 3:
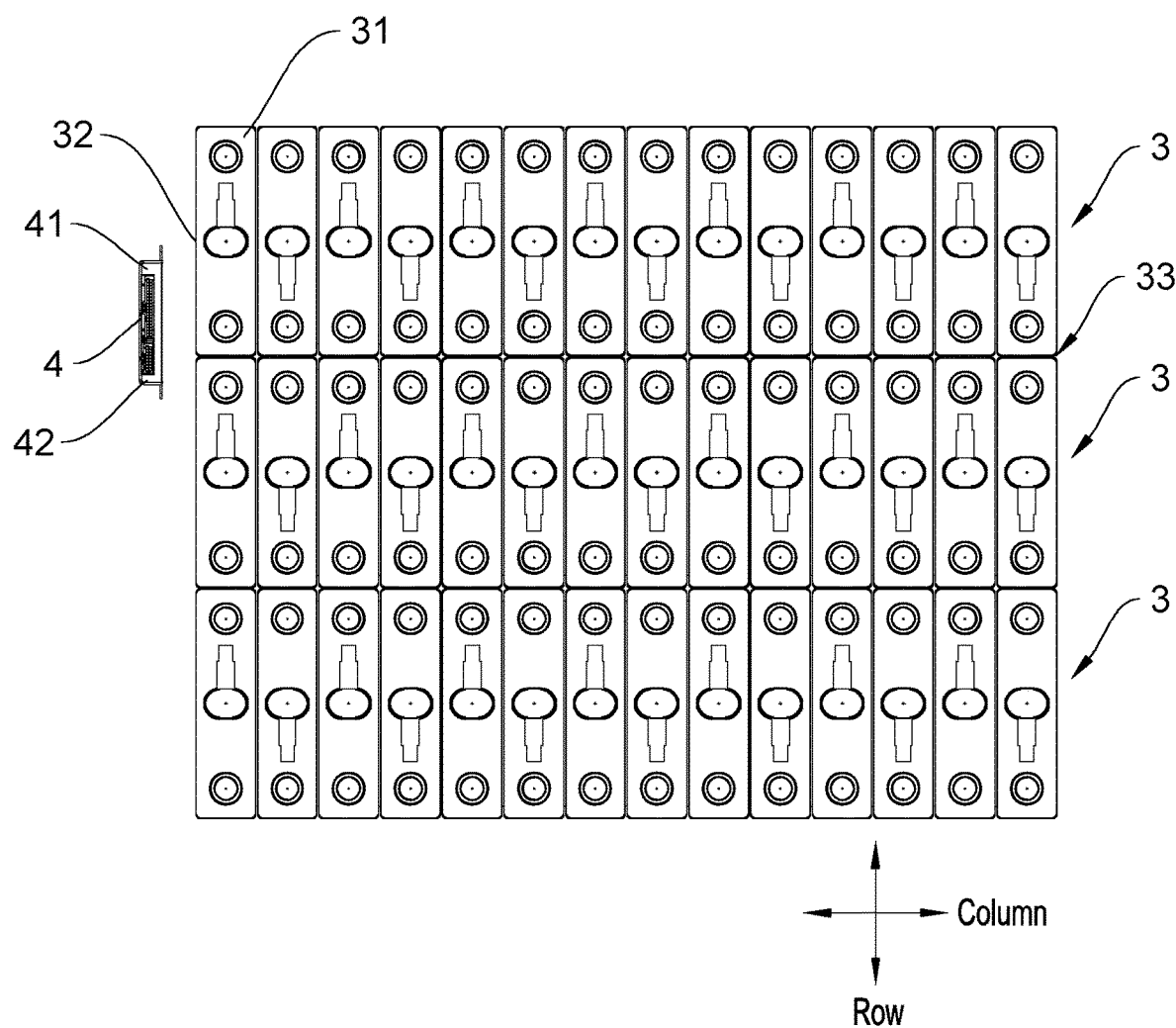
FIG. 3 shows a top view of a battery monitoring unit and battery sets according to a second embodiment of the disclosure.

As shown in FIG. 3, FIG. 3 shows a top view of a battery monitoring unit 4 and battery sets 3 according to a second embodiment of the disclosure. The similarities between the second embodiment and the first embodiment will not be repeated here, and the difference lies in that an orthographic projection of the battery monitoring unit 4 on the battery sets 3 in the column direction at least partially coincides with the junction 33.

Specifically, the battery monitoring unit 4 of the embodiment is not centrally disposed at the junction 33, but in the row direction, the battery monitoring unit 4 is divided into the first part 41 and the second part 42 with unequal sizes by the junction 33.

In the embodiment, the size of the first part 41 is larger than the size of the second part 42. Of course, in some embodiments, the size of the first part 41 may also be smaller than the size of the second part 42.

Figure 4:
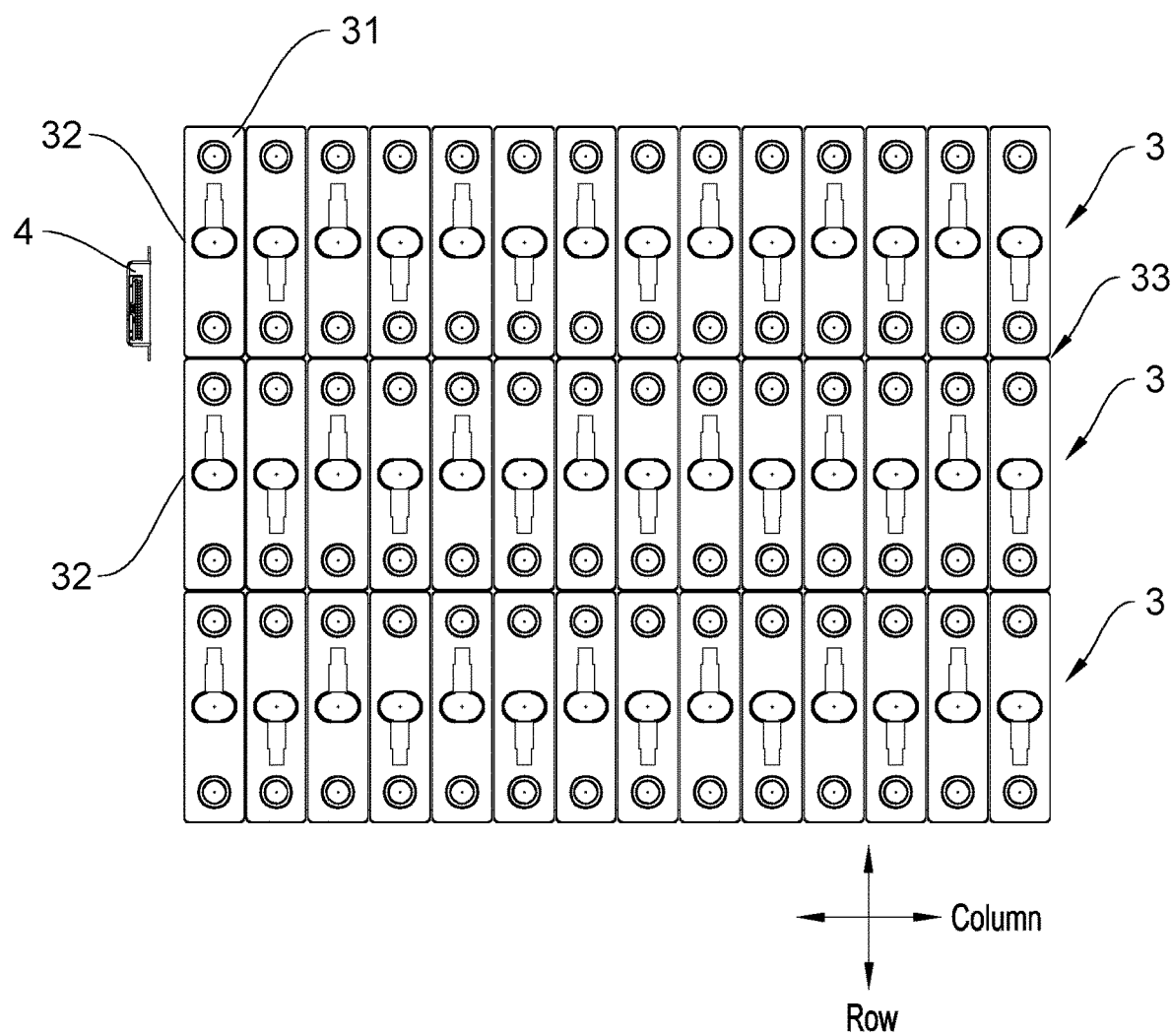
FIG. 4 shows a top view of a battery monitoring unit and battery sets according to a third embodiment of the disclosure.

As shown in FIG. 4, FIG. 4 shows a top view of a battery monitoring unit 4 and battery sets 3 according to a third embodiment of the disclosure. The similarities between the third embodiment and the first embodiment will not be repeated, and the difference lies in that in the column direction, the battery monitoring unit 4 is disposed corresponding to only one battery set 3.

In other words, in the column direction, the orthographic projection of the battery monitoring unit 4 on the battery set 3 falls in the end surface of only one battery set 3, and the orthographic projection is staggered from the expansion portion 32 of the battery set 3.

It can be understood that when the battery pack 100 includes only one battery set 3, the battery monitoring unit 4 may be disposed by adopting the embodiment shown in FIG. 4.

Figure 5:
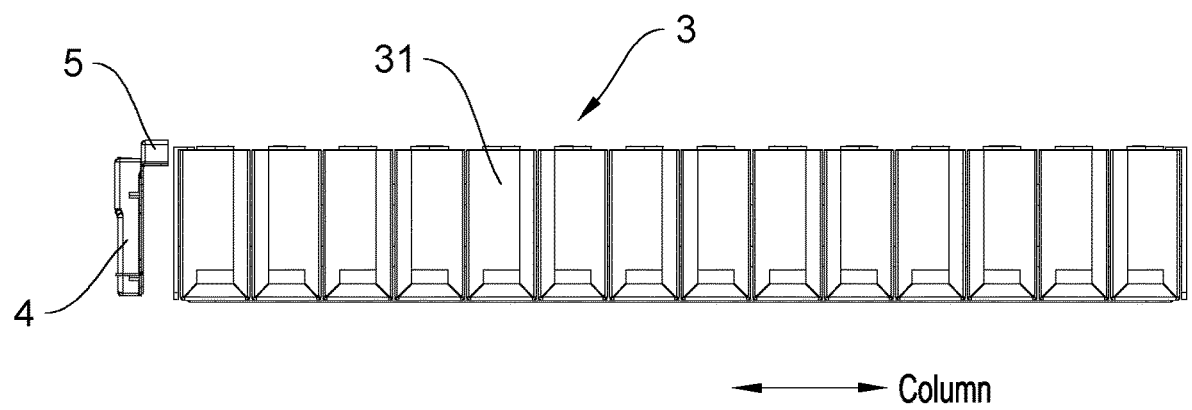
FIG. 5 shows a side view of a battery monitoring unit and a battery set according to the disclosure.

As shown in FIG. 5, FIG. 5 shows a side view of a battery monitoring unit 4 and a battery set 3 according to the disclosure. The battery monitoring unit 4 and the end surface of the battery set 3 are disposed at an interval. Since the expansion portion 32 is formed on the end surface of the battery set 3, in the embodiment, the battery monitoring unit 4 and the end surface of the battery set 3 are disposed at an interval, such that when the expansion portion 32 is expanded and deformed, the interval between the battery monitoring unit 4 and the end surface of the battery set 3 can relieve the expansion of the expansion portion 32 to avoid the expansion portion 32 squeezing the battery monitoring unit 4 due to direct attachment between the battery monitoring unit 4 and the battery set 3.

Figure 6:
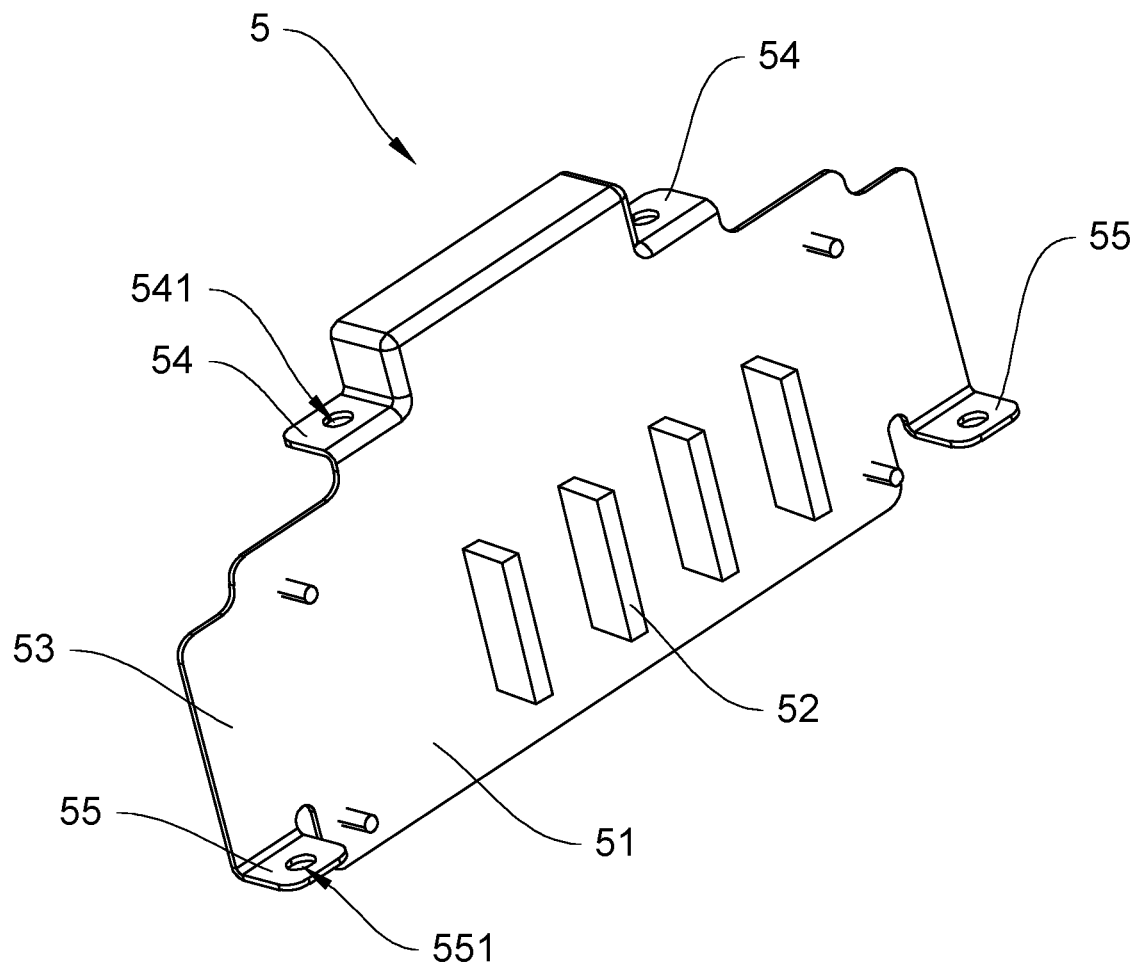
FIG. 6 shows a schematic view of an installation bracket according to the disclosure.

As shown in FIG. 1 and FIG. 6, FIG. 6 shows a schematic view of an installation bracket 5 according to the disclosure. The battery pack 100 of the embodiment of the disclosure further includes the installation bracket 5. The installation bracket 5 is disposed in the sealed chamber of the case body 1 and is connected to the case body 1. The battery monitoring unit 4 is connected to the installation bracket 5.

The installation bracket 5 is disposed on the end surface of the battery set 3 and has an installation surface 51 away from the battery set 3. The battery monitoring unit 4 is installed on the installation surface 51. The installation bracket 5 may be made of a metal material. Further, the installation bracket 5 may be made of a metal material with relatively high structural hardness, such as steel. Since the installation bracket 5 is connected to the case body 1, and since the structural hardness of the installation bracket 5 is relatively high, the installation bracket 5 is not easily deformed. When the battery set 3 expands and the expansion portion 32 squeezes the installation bracket 5, the installation bracket 5 can relieve the squeeze of the expansion portion 32, so that the battery monitoring unit 4 is not easily squeezed.

The installation bracket 5 further has a protruding portion 52. The protruding portion 52 protrudes from the installation surface 51, so that the battery monitoring unit 4 and the installation surface 51 are disposed at an interval. The configuration of the protruding portion 52 enables the battery monitoring unit 4 and the installation surface 51 to be disposed at an interval. The interval between the battery monitoring unit 4 and the installation surface 51 can further relieve the squeeze of the expansion portion 32. In addition, the protruding portion 52 may also improve the structural strength of the installation bracket 5, so that the installation bracket 5 is less likely to be deformed when being squeezed by the expansion portion 32.

It can be understood that the shape of the protruding portion 52 may be a protruding point, a protruding rib, other suitable shapes, or a combination of the above. When the protruding portion 52 is the protruding point, the installation surface 51 is protruded with multiple protruding points, and the protruding points may be disposed in an array. When the protruding portion 52 is the protruding rib, the number of protruding ribs may be multiple. Each protruding rib may extend in the row direction or in a direction perpendicular to the row direction. Of course, the protruding portion 52 may also be a combination of the protruding point and the protruding rib.

Please continue to refer to FIG. 6. The installation bracket 5 includes a main body portion 53, a first connecting portion 54, and a second connecting portion 55. One side surface of the main body portion 53 forms the installation surface 51, and the protruding portion 52 protrudes from the side surface of the main body portion 53. The battery monitoring unit 4 is installed on the main body portion 53. The first connecting portion 54 is connected to the main body portion 53 and is used to connect to a partition wall 13 of the case body 1. The second connecting portion 55 is connected to the main body portion 53 and is used to connect to a bottom wall of the lower case 12.

As an example, the first connecting portion 54, the second connecting portion 55, and the main body portion 53 are an integral structure. The first connecting portion 54 and the second connecting portion 55 may both be bent structures. The bent structures are formed on an edge of the main body portion 53 through integral bending.

The first connecting portion 54 has a first via 541 and the second connecting portion 55 has a second via 551. The first via 541 and the second via 551 may allow bolts to pass therethrough, so that the installation bracket 5 may be connected to the case body 1 by the bolts, but not limited thereto.

Figure 7:
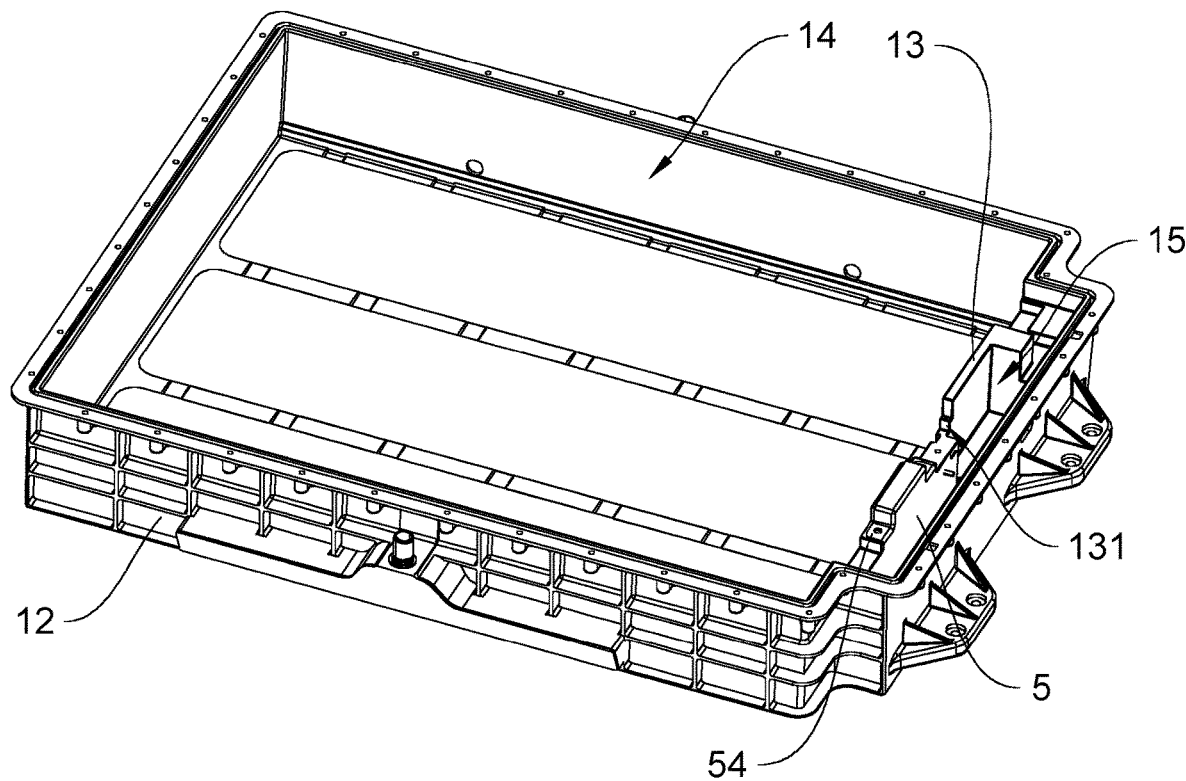
FIG. 7 shows a schematic view of an installation bracket installed on a lower case according to the disclosure.

As shown in FIG. 7, FIG. 7 shows a schematic view of an installation bracket 5 installed on a lower case 12 according to the disclosure. The case of the embodiment of the disclosure further includes a partition wall 13. The partition wall 13 may be integrally formed on the lower case 12, and the partition wall 13 extends in the row direction and divides the sealed chamber into a first accommodating space 14 and a second accommodating space 15. The battery set 3 is accommodated in the first accommodating space 14, and the battery monitoring unit 4 is accommodated in the second accommodating space 15. The first connecting portion 54 of the installation bracket 5 is connected to the partition wall 13, and the second connecting portion 55 of the installation bracket 5 is connected to the bottom wall of the lower case 12.

Referring to FIG. 6 and FIG. 7, the main body portion 53 of the installation bracket 5 may be a plate structure. The main body portion 53 is attached to a side surface of the partition wall 13 facing the second accommodating space 15. A side surface of the main body portion 53 facing away from the partition wall 13 is formed with the installation surface 51, so that the battery monitoring unit 4 is connected to one side of the installation bracket 5 facing away from the partition wall 13.

Since the battery monitoring unit 4 is installed on the installation bracket 5, the second connecting portion 55 of the installation bracket 5 is connected to the lower case 12. In this way, the installation bracket 5 can also play the role of conducting heat, so that heat generated by the battery monitoring unit 4 is conducted to the lower case 12 through the installation bracket 5.

The partition wall 13 has a notch 131. The notch 131 is communicated with the first accommodating space 14 and the second accommodating space 15. Through the configuration of the notch 131, the coolant flows back and forth in the first accommodating space 14 and the second accommodating space 15, so that the coolant cools the battery sets 3 and the battery monitoring unit 4.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:
    a battery set, including a plurality of battery units, wherein the battery units are disposed side by side in a column direction; in the column direction, one of the battery units located at one end of the battery set has an expansion portion, and the expansion portion is formed in a center region of an end surface of the battery set in the column direction;
    a battery monitoring unit, disposed on the end surface of the battery set, wherein in the column direction, the battery monitoring unit is staggered from the expansion portion;
    a case body, having a sealed chamber, wherein the battery set and the battery monitoring unit are disposed in the sealed chamber; and
    an installation bracket, disposed in the sealed chamber and connected to the case body, wherein the battery monitoring unit is connected to the installation bracket, wherein the case body further comprises a partition wall, the partition wall extends in a row direction and divides the sealed chamber into a first accommodating space and a second accommodating space, the battery set is accommodated in the first accommodating space, and the battery monitoring unit is accommodated in the second accommodating space,
    the installation bracket is connected to the partition wall.

2. The battery pack according to claim 1, wherein the battery set is plural in number, and the plurality of battery sets are disposed side by side in the row direction, wherein the row direction is perpendicular to the column direction;
    an orthographic projection of the battery monitoring unit on the battery sets in the column direction at least partially coincides with a junction of adjacent two of the battery sets.

3. The battery pack according to claim 2, wherein in the column direction, the battery monitoring unit is centrally disposed at the junction of the adjacent two of the battery sets.

4. The battery pack according to claim 1, wherein the battery monitoring unit and the end surface of the battery set are disposed at an interval.

5. The battery pack according to claim 1, wherein the installation bracket is disposed on the end surface of the battery set and has an installation surface away from the battery set, and the battery monitoring unit is installed on the installation surface.

6. The battery pack according to claim 5, wherein the installation bracket further has a protruding portion, and the protruding portion protrudes from the installation surface and enables the battery monitoring unit and the installation surface to be disposed at an interval.

7. The battery pack according to claim 1, wherein the battery monitoring unit is connected to a side of the installation bracket away from the partition wall.

8. The battery pack according to claim 1, wherein the installation bracket comprises:
    a main body portion, wherein the battery monitoring unit is installed on the main body portion;
    a first connecting portion, connected to the main body portion and connected to the partition wall; and
    a second connecting portion, connected to the main body portion and connected to a bottom wall of the case body.

* * * * *